(12) United States Patent
Robison et al.

(10) Patent No.: US 12,554,441 B2
(45) Date of Patent: Feb. 17, 2026

(54) TRANSFERRING COMPRESSED DATA BETWEEN LOCATIONS

(71) Applicant: International Business Machines Corporation, Armonk, NY (US)

(72) Inventors: Micah Robison, Tucson, AZ (US); Matthew G. Borlick, Tucson, AZ (US); Lokesh Mohan Gupta, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 21 days.

(21) Appl. No.: 18/673,071

(22) Filed: May 23, 2024

(65) Prior Publication Data

US 2025/0362832 A1    Nov. 27, 2025

(51) Int. Cl.
*G06F 3/06* (2006.01)

(52) U.S. Cl.
CPC .......... *G06F 3/0659* (2013.01); *G06F 3/0608* (2013.01); *G06F 3/068* (2013.01)

(58) Field of Classification Search
CPC ....... G06F 3/0659; G06F 3/0608; G06F 3/068
See application file for complete search history.

(56) References Cited

U.S. PATENT DOCUMENTS

| | | | |
|---|---|---|---|
| 10,289,320 B1 | 5/2019 | Wigmore | |
| 10,482,911 B1 | 11/2019 | Nanjunda Swamy | |
| 10,956,346 B1 | 3/2021 | Ben-Yehuda et al. | |
| 10,963,393 B1 | 3/2021 | Ben-Yehuda et al. | |
| 11,256,431 B1 | 2/2022 | Ben-Yehuda et al. | |
| 2017/0286215 A1* | 10/2017 | Gerhard | G06F 3/0689 |
| 2023/0333737 A1* | 10/2023 | Subramanian | G06F 3/061 |
| 2025/0044968 A1* | 2/2025 | Nagao | G06F 3/0673 |
| 2025/0156449 A1* | 5/2025 | Sakowski | G06F 16/24561 |

OTHER PUBLICATIONS

IBM, "Implementing IBM Real-time Compression in SAN Volume Controller and IBM Storwize V7000," IBM Redbooks Solution Guide, 2015, pp. 9.

Dell Technologies, "Dell PowerStore: Best Practices Guide," Jul. 2022, pp. 16.

ip.com, Annonymous, "Method for Enhanced Application Performance During FlashCopy Restore in Multi-Tier Storage Environment," Nov. 28, 2017, pp. 8.

(Continued)

*Primary Examiner* — Kenneth M Lo
*Assistant Examiner* — Jonah C Krieger
(74) *Attorney, Agent, or Firm* — Zilka-Kotab, P.C.

(57) ABSTRACT

A computer-implemented method, according to one approach, includes: causing compressed data to be read from a first compressed drive without decompressing the compressed data. A copy of the compressed data is also received from the first compressed drive. In response to determining a target location for the copy of the compressed data is a second compressed drive having a same configuration as the first compressed drive, the copy of the compressed data is transmitted to the second compressed drive. Moreover, the compressed data is written to the target location in the second compressed drive without compressing the compressed data.

20 Claims, 7 Drawing Sheets

(56) References Cited

OTHER PUBLICATIONS ip.com, Annonymous, "System and Method to Improve Rebuild/Copy Back Performance in De-clustered Storage Device Array with Partition Groups," Jul. 14, 2020, pp. 6.

ip.com, Annonymous, "Method and Apparatus for Adding Encryption Capabilities to a Filesystem," Sep. 29, 2021, pp. 9.

ip.com, Annonymous, "Method and Apparatus for Improved READ Access Policy for NVMe Drives in the Storage System," Mar. 15, 2022, pp. 8.

* cited by examiner

TRANSFERRING COMPRESSED DATA BETWEEN LOCATIONS

BACKGROUND

The present invention relates to data compression, and more specifically, this invention relates to processing compressed data.

Data production has continued to increase, particularly as computing power and the use of IoT devices continue to advance. For instance, the rise of smart enterprise endpoints has led to large amounts of data being generated at remote locations. Data production will only further increase with the growth of 5G networks and an increased number of connected mobile devices.

This issue has also become more prevalent as the complexity of machine learning models increases. Increasingly complex machine learning models translate to more intense workloads and increased strain associated with applying the models to received data. The operation of conventional implementations has thereby been negatively impacted.

While cloud computing has been implemented in some conventional systems in an effort to improve the ability to process this increasing amount of data, moving large amounts of data from distributed locations to a central cloud location places a significant strain on the networks as well as other logical and/or physical components used to perform the data migration. For example, the process of moving certain workloads to cloud assumes that the computational efficiency gained outweighs the "cost" getting the workloads to the cloud in the first place. This is becoming increasingly untrue.

While data compression provides some relief to the network by reducing the overall amount of data being transferred, it also introduces a significant source of strain. For instance, while compressed data may consume less storage space, the process of decompressing the data any time it is accessed (e.g., read, written to, deleted, modified, etc.) and re-compressing it again before returning to storage adds significant processing strain. Accordingly, conventional products have been forced to choose between significantly taxing network resources, and significantly taxing storage capacity.

SUMMARY

A computer-implemented method (CIM), according to one approach, includes: causing compressed data to be read from a first compressed drive without decompressing the compressed data. A copy of the compressed data is also received from the first compressed drive. In response to determining a target location for the copy of the compressed data is a second compressed drive having a same configuration as the first compressed drive, the copy of the compressed data is transmitted to the second compressed drive. Moreover, the compressed data is written to the target location in the second compressed drive without compressing the compressed data.

A computer program product (CPP), according to another approach, includes: a set of one or more computer-readable storage media, and program instructions. The program instructions are collectively stored in the set of one or more storage media, and are for causing a processor set to perform the foregoing CIM.

A computer system (CS), according to yet another approach, includes: a processor set, and a set of one or more computer-readable storage media. The CS also includes program instructions that are collectively stored in the set of one or more storage media, and for causing the processor set to perform the foregoing CIM.

Other aspects and implementations of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred approaches of systems, methods, and computer program products for improved processing (e.g., handling) of compressed data. Approaches herein provide an interface that allows for compressed data to be transferred between environments that implement the same or similar compression configurations, without decompressing and recompressing the data in order to do so. In other words, approaches herein are desirably able to read compressed data from a first drive, and write the compressed data to a second drive, without decompressing the data in-transit. Using compressed data improves storage capacity, but the ability to access and transfer the compressed data without decompressing it adds an improvement to network overhead as well, e.g., as will be described in further detail below.

In one general approach, a CIM includes: causing compressed data to be read from a first compressed drive without decompressing the compressed data. A copy of the compressed data is also received from the first compressed drive. In response to determining a target location for the copy of the compressed data is a second compressed drive having a same configuration as the first compressed drive, the copy of the compressed data is transmitted to the second compressed drive. Moreover, the compressed data is written to the target location in the second compressed drive without compressing the compressed data.

In another general approach, a CPP includes: a set of one or more computer-readable storage media, and program instructions. The program instructions are collectively stored in the set of one or more storage media, and are for causing a processor set to perform the foregoing CIM.

In another general approach, a CS includes: a processor set, and a set of one or more computer-readable storage media. The CS also includes program instructions that are collectively stored in the set of one or more storage media, and for causing the processor set to perform the foregoing CIM.

Various aspects of the present disclosure are described by narrative text, flowcharts, block diagrams of computer systems and/or block diagrams of the machine logic included in CPP approaches. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product approach ("CPP approach" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
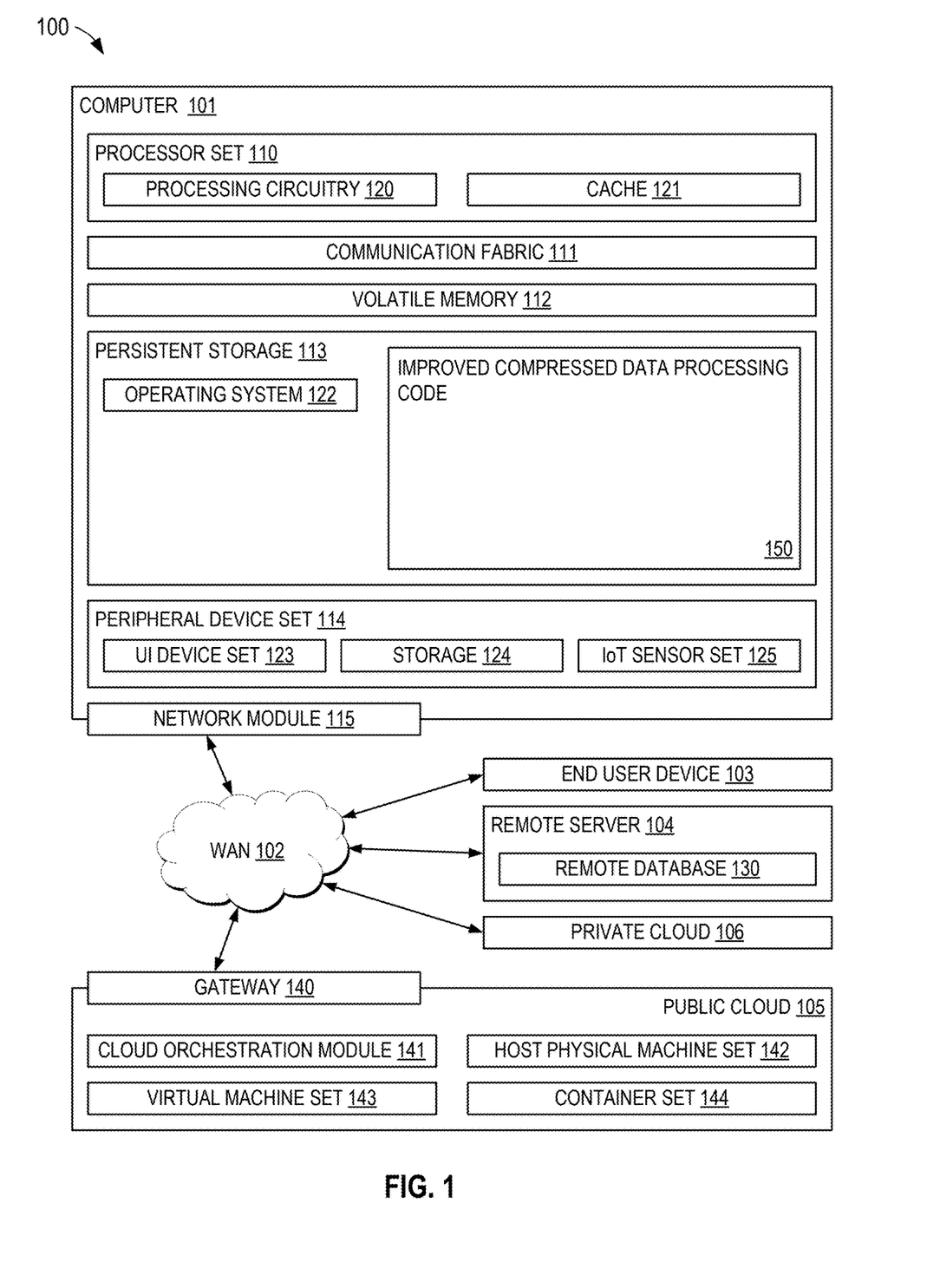
FIG. 1 is a diagram of a computing environment, in accordance with one approach.

Computing environment 100 contains an example of an environment for the execution of at least some of the computer code involved in performing the inventive methods, such as improved compressed data processing code at block 150 allowing for compressed data to be transferred between environments that implement the same or similar compression configurations, without decompressing and recompressing the data in order to do so. In other words, approaches herein are desirably able to read compressed data from a first drive, and write the compressed data to a second drive, without decompressing the data in-transit. Using compressed data improves storage capacity, but the ability to access and transfer the compressed data without decompressing it adds an improvement to network overhead as well, e.g., as will be described in further detail below.

In addition to block 150, computing environment 100 includes, for example, computer 101, wide area network (WAN) 102, end user device (EUD) 103, remote server 104, public cloud 105, and private cloud 106. In this approach, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various approaches, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some approaches, storage 124 may take the form of a quantum computing storage device for storing data in the form of qubits. In approaches where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some approaches, network control functions and network forwarding functions of network module 115 are performed on the same physical hardware device. In other approaches (for example, approaches that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some approaches, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some approaches, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144.

It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other approaches a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this approach, public cloud 105 and private cloud 106 are both part of a larger hybrid cloud.

CLOUD COMPUTING SERVICES AND/OR MICROSERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some approaches, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

In some aspects, a system according to various approaches may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various approaches.

As noted above, data production has continued to increase, particularly as computing power and the use of IoT devices continue to advance. For instance, the rise of smart enterprise endpoints has led to large amounts of data being generated at remote locations. Data production will only further increase with the growth of 5G networks and an increased number of connected mobile devices.

This issue has also become more prevalent as the complexity of machine learning models increases. Increasingly complex machine learning models translate to more intense workloads and increased strain associated with applying the models to received data. The operation of conventional implementations has thereby been negatively impacted.

While cloud computing has been implemented in some conventional systems in an effort to improve the ability to process this increasing amount of data, moving large amounts of data from distributed locations to a central cloud location places a significant strain on the networks as well as other logical and/or physical components used to perform the data migration. For example, the process of moving certain workloads to cloud assumes that the computational efficiency gained outweighs the "cost" getting the workloads to the cloud in the first place. This is becoming increasingly untrue.

While data compression provides some relief to the network by reducing the overall amount of data being transferred, it also introduces a significant source of strain. For instance, while compressed data may consume less storage space, the process of decompressing the data any time it is accessed (e.g., read, written to, deleted, modified, etc.) and re-compressing it again before returning to storage adds significant processing strain. Accordingly, conventional products have been forced to choose between significantly taxing network resources, and significantly taxing storage capacity.

In sharp contrast, approaches herein are desirably able to access and transfer compressed data without decompressing it. In other words, approaches herein are desirably able to read compressed data from a first drive, and write the compressed data to a second drive, without decompressing the data in-transit. Using compressed data improves storage capacity, but the ability to access and transfer the compressed data without decompressing it adds an improvement to network overhead as well, e.g., as will be described in further detail below.

Figure 2A:
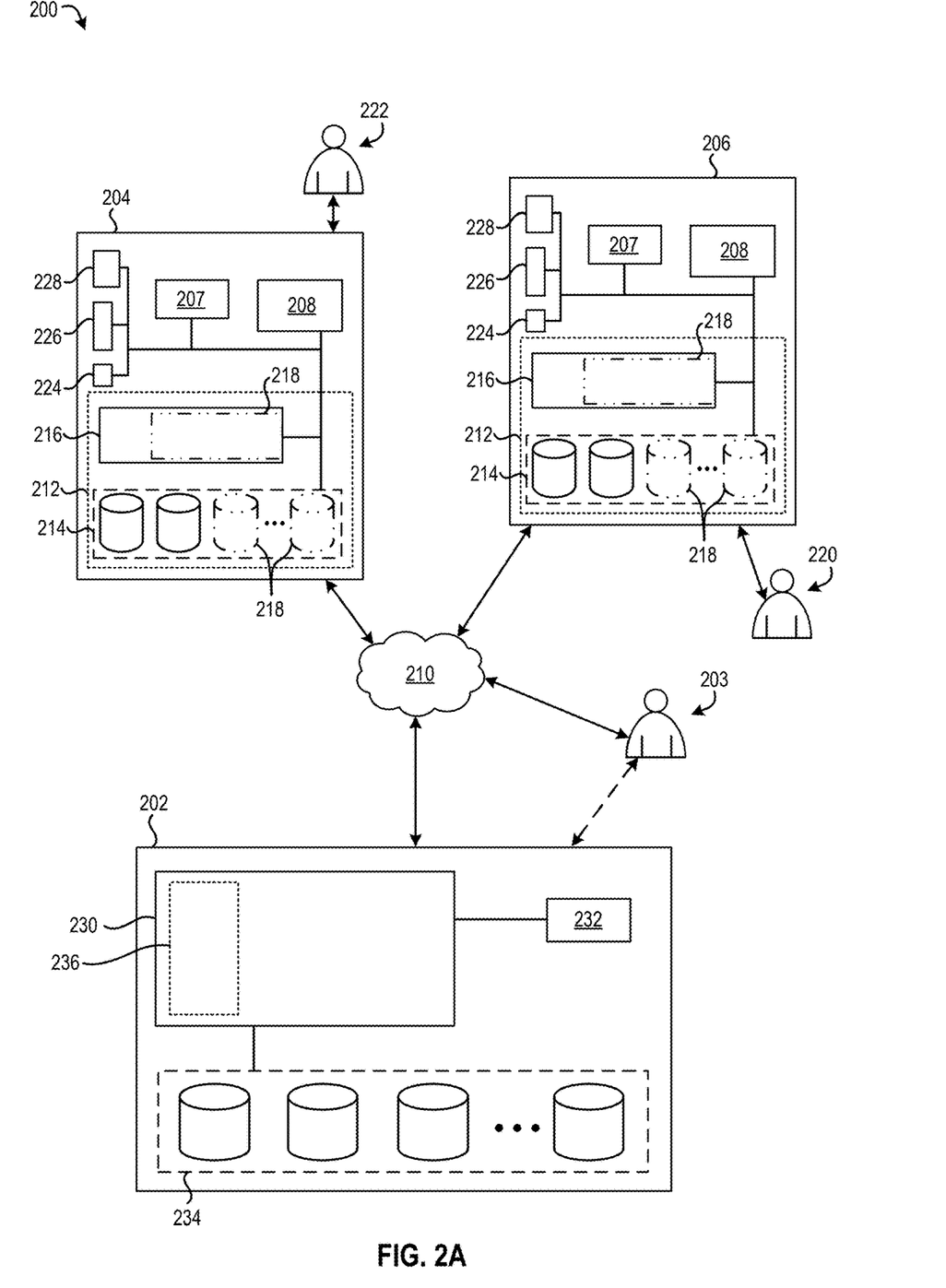
FIG. 2A is a representational view of a distributed system, in accordance with one approach.

Looking now to FIG. 2A, a distributed data storage system 200 in accordance with one approach. As an option, the present system 200 may be implemented in conjunction with features from any other approach listed herein, such as those described with reference to the other FIGS. However, this distributed data storage system 200 and others presented herein may be used in various applications and/or in permutations which may or may not be specifically described in the illustrative approaches or implementations listed herein. Further, the system 200 presented herein may be used in any desired environment. Thus FIG. 2A (and the other FIGS.) may be deemed to include any possible permutation.

As shown, the distributed data storage system 200 includes a central server 202 that is connected to edge nodes 204, 206. Specifically, the central server 202 and edge nodes 204, 206 are connected to a network 210 that allows for data (e.g., information, commands, requests, instructions, responses, encrypted data, etc.) to be sent between any of the locations 202, 204, 206. The network 210 may be of any type, e.g., depending on the desired approach. For instance, in some approaches the network 210 is a WAN, e.g., such as the Internet. However, an illustrative list of other network types which network 210 may implement includes, but is not limited to, a LAN, a PSTN, a SAN, an internal telephone network, etc. As a result, any desired information, data, commands, instructions, responses, requests, etc. may be sent between the locations 202, 204, 206, regardless of the amount of separation which exists therebetween, e.g., despite being positioned at different geographical locations. It should also be noted that the different locations 202, 204, 206 may be connected to each other (and/or other locations) differently depending on the approach. According to an example, two data storage systems may be located relatively close to each other and connected by a wired connection, e.g., a cable, a fiber-optic link, a wire, etc.; etc., or any other type of connection which would be apparent to one skilled in the art after reading the present description.

With continued reference to FIG. 2A, the edge nodes 204, 206 each preferably provide a respective data storage system. Data may thereby be stored in either of the edge nodes 204, 206 and/or transferred therebetween. According to an example, the edge nodes 204, 206 may each be a DS8000 series storage media platform capable of storing data and satisfying various data operations. In other approaches, one or more of the edge nodes 204, 206 may be a respective data storage system implementing one or more desired types of memory.

The data may also be handled (e.g., stored) differently in the edge nodes 204, 206 depending on the particular approach. For instance, in some approaches, one or more RAID configurations may be implemented across the edge nodes 204, 206. In other words, redundant portions of data may be stored across the edge nodes 204, 206 in order to improve data retention.

The edge nodes 204, 206 are also preferably configured to implement data compression. As noted above, data compression desirably improves storage capacity by reducing the effective size of the data being stored in memory. Accordingly, each of the edge nodes 204, 206 are shown as including a compression engine 207 coupled to the central controller 208 (e.g., processor) thereof. The compression engine 207 may work together with the controller 208 to compress data before writing the compressed data into memory 212. Depending on the approach, the compression engine 207 in each of the edge nodes 204, 206 may implement any desired compression configuration (e.g., compression scheme). In other words, each of the edge nodes 204, 206 may use the respective compression engine 207 to apply a desired compression rate, compression pattern, formatting details, compressed data lookup scheme, etc.

While the edge nodes 204, 206 may each implement data compression as desired, in preferred approaches the edge nodes 204, 206 apply the same or substantially similar compression schemes. In other words, the compression engine 207 in each edge node 204, 206 preferably compresses data the same, e.g., such that it is written to and/or read from memory using the same steps, techniques, formatting details, etc., e.g., as would be appreciated by one skilled in the art after reading the present description. In other approaches, the controllers 208 are configured to instruct the compression engines 207 to follow the same processes (e.g., see FIG. 3A below), thereby achieving the same or substantially similar compression configurations in both edge nodes 204, 206.

Implementing the same or substantially similar data compression techniques as such desirably allows for compressed data to be transferred between the edge nodes 204, 206 without decompressing and/or recompressing the data in order to do so. In other words, compressed data may be transferred between two environments that implement the same or similar compression configurations. While the compressed data may be unintelligible and/or inaccessible in transit between the edge nodes 204, 206 (e.g., while at the central server 202), it can be written to a specific target location (e.g., compression boundary) in memory of the respective edge node 204, 206 without first recompressing the data. Thus, by monitoring data operations for those that involve transferring compressed data between locations (e.g., compressed drives) that implement a same and/or substantially similar compression configuration, approaches herein are able to significantly reduce the processing overhead consumed in the system by data transfers. The same is true for data transfers between locations in the same data storage, e.g., such as transferring and/or copying compressed data from a first drive in a data storage system, to a second drive in the data storage system. For example, approaches herein may be used in order to perform jobs, e.g., including an initial copy for a peer-to-peer copy, an initial copy for a Flash copy, etc., and similar jobs.

Referring still to FIG. 2A, the memory 212 may include any amount, type, configuration, etc. of storage components therein. For instance, the present approach includes an array of hard disk drives (HDDs) 214, along with a non-volatile random access memory (NVRAM) module 216. The NVRAM module 216 may further include Flash memory, phase change memory (PCM), etc., or any other desired type of NVRAM. It follows that the array of HDDs 214 and NVRAM module 216 are configured and used to store various data. Compressed sections 218 of the HDDs 214 and NVRAM module 216 are further configured to store compressed data therein. As noted above, compressing data before it is stored in memory significantly increases storage capacity of the memory. Thus, the compression engine 207 and/or controller 208 may read compressed data from and/or write compressed data to the compressed sections 218 of memory.

It should be noted that in some approaches, any of the compressed sections 218 in the HDDs 214 and NVRAM module 216 of edge node 204 may be considered as having the same or similar compression configuration as any compressed sections 218 in edge node 206. However, in other approaches the compressed sections 218 in the HDDs 214 of edge node 204 may have the same or similar compression configuration as the compressed sections 218 in the HDDs 214 of edge node 206, while the compressed section 218 in the NVRAM module 216 of edge node 204 may have the same or similar compression configuration as the compressed section 218 in the NVRAM module 216 of edge node 206. It should also be noted that "reading" compressed data from the compressed sections 218 of memory preferably involves accessing the compressed data without decompressing it. For instance, a start point and/or end point in the compressed data may be identified, thereby defining a region of compressed data to copy from the compressed sections 218.

Figure 2B:
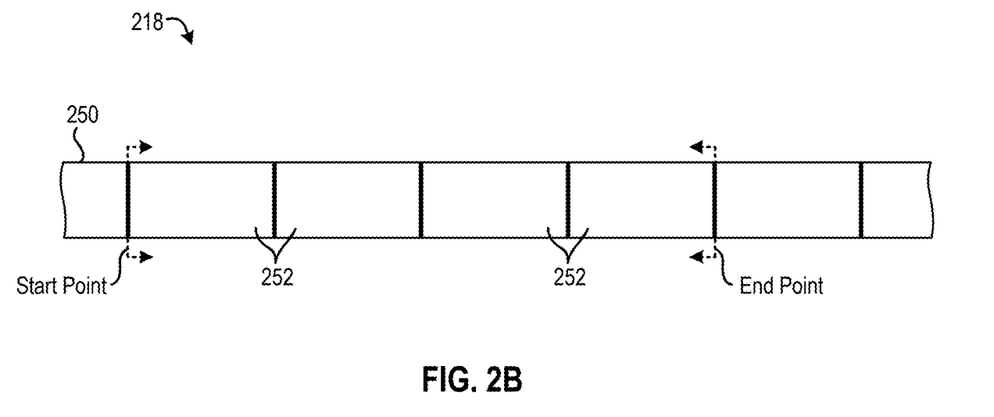
FIG. 2B is representational view of compression boundaries with start and end points, in accordance with one approach.
Figure 2C:
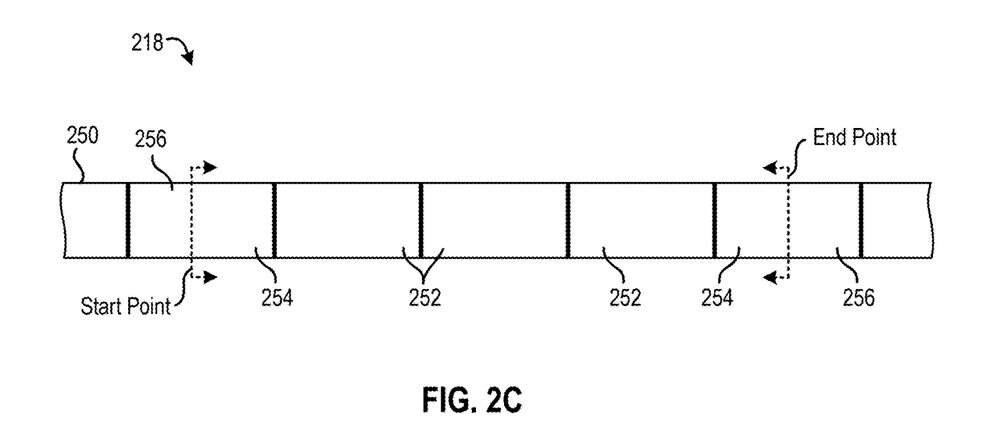
FIG. 2C is representational view of compression boundaries with start and end points, in accordance with another approach.

Referring momentarily to FIGS. 2B-2C, start and end points for compressed data read operations are shown in accordance with different approaches, which are in no way intended to be limiting. Looking first to FIG. 2B, a compressed data track 250 in one of the compressed sections 218 is shown. The track 250 includes partitions that create a number of compression boundaries 252. In some approaches, the size (e.g., storage capacity), number, arrangement, etc., of these compression boundaries 252 may differ between compression configurations. Thus, the compression boundaries 252 may be inspected in some approaches to determine whether two compression drives apply the same or substantially similar compression schemes (e.g., whether two compression drives are "compatible").

The track 250 in FIG. 2B is shown as having the Start Point and End Point of a compressed data read operation fall on the intersections between complete compression boundaries 252. The read operation thereby only involves retrieving all the data from each complete (e.g., whole) compression boundary 252. As noted above, this may be performed without decompressing the compressed data in the compression boundaries 252. This desirably reduces the processing overhead experienced by the system by significantly reducing the amount of data decompression performed. In comparison, conventional products have been forced to decompress data each time it is read from memory. These improvements are also apparent while writing compressed data back to memory. Again, compressed data may be written into complete compression boundaries 252 without having to perform any recompression. Approaches herein are thereby able to further reduce processing overhead.

While compressed data may be accessed (e.g., copied) from and/or written to complete compression boundaries in this manner, partial compression boundaries may involve decompressing the data therein. Looking now to FIG. 2C, the track 250 is shown as having the Start Point and End Point of a compressed data read operation fall between the intersections of the compression boundaries 252. In this situation, compressed data may be extracted from the three complete compression boundaries 252 positioned between the Start Point and End Point without performing any decompression, e.g., as described above with respect to FIG. 2B. However, partial compression boundaries 254 are also included between the Start and End Points. In order to access (e.g., copy) data in a partial compression boundary 254, data in both the partial compression boundary 254 and the remaining compression boundary 256 is decompressed. The compressed data may be decompressed using one or more compression engines (e.g., see compression engine 207 in FIG. 2A).

Once decompressed, data corresponding to the specific boundaries 254, 256 (e.g., portions) may be accessed and copied separately. Writing data to a compressed drive having the Start Point and End Point shown in FIG. 2C may be performed in a similar manner. Again, compressed data may be written to complete compression boundaries 252 without having to decompress or recompress the data beforehand (e.g., in transit). However, writing data to a partial compression boundary 254 involves decompressing the remaining compression boundary 256 and combining it with the data in the partial compression boundary 254. The combined uncompressed data may thereby form a complete compression boundary that can be compressed and written to the track 250.

Returning now to FIG. 2A, edge nodes 204, 206 may receive inputs from, and interface with, users 220, 222. For instance, users 220, 222 may input information using one or more of: a display screen 224, keys of a computer keyboard 226, a computer mouse 228, a microphone (not shown), a camera (not shown), etc. The controller 208 may thereby be configured to receive inputs (e.g., text, sounds, images, motion data, etc.) from any of these components as entered by the users 220, 222. These inputs typically correspond to information presented on the display screen 224 while the entries were received. Moreover, the inputs received from the keyboard 226 and computer mouse 228 may impact the information shown on display screen 224, data stored in memory 212, information collected from a microphone and/or camera, status of an operating system being implemented by controller 208, etc.

The central server 202 further includes a large (e.g., robust) processor 230 coupled to a cache 232 and memory 234 having a relatively high storage capacity. The central server 202 is thereby able to help facilitate data transfers between storage locations, e.g., as a result of receiving instructions from an administrator 203. For example, central server 202 may cause (e.g., initiate) a transfer (e.g., copy, movement, etc.) of compressed data from edge node 204 to edge node 206. For example, approaches herein may be used in order to perform jobs, e.g., including an initial copy for a peer-to-peer copy, an initial copy for a Flash copy, etc., and similar jobs.

The compressed data may thereby travel to the central server 202 in some approaches, before being sent along to the target edge node. Accordingly, the processor 230 includes a compression engine 236. The compression engine 236 preferably does not decompress (e.g., process) compressed data being transferred between the edge nodes 204, 206, or any other locations implementing the same or substantially similar compression configurations. Rather, the received data is maintained in compressed formed before being sent to the target location and written to memory, e.g., as described above in connection with FIGS. 2B-2C.

It should be noted that with respect to the present description, "data" may include any desired type of information. For instance, in different implementations data can include raw sensor data, metadata, program commands, instructions, etc. Moreover, while implementations herein are described in the context of compressed data, this is in no way intended to be limiting. Data may also be protected with different types of security features depending on the approach. The way in which data is protected has an impact on how that data may be processed and/or stored. For instance, data encryption may be implemented in combination with data compression as described herein.

Figure 3A:
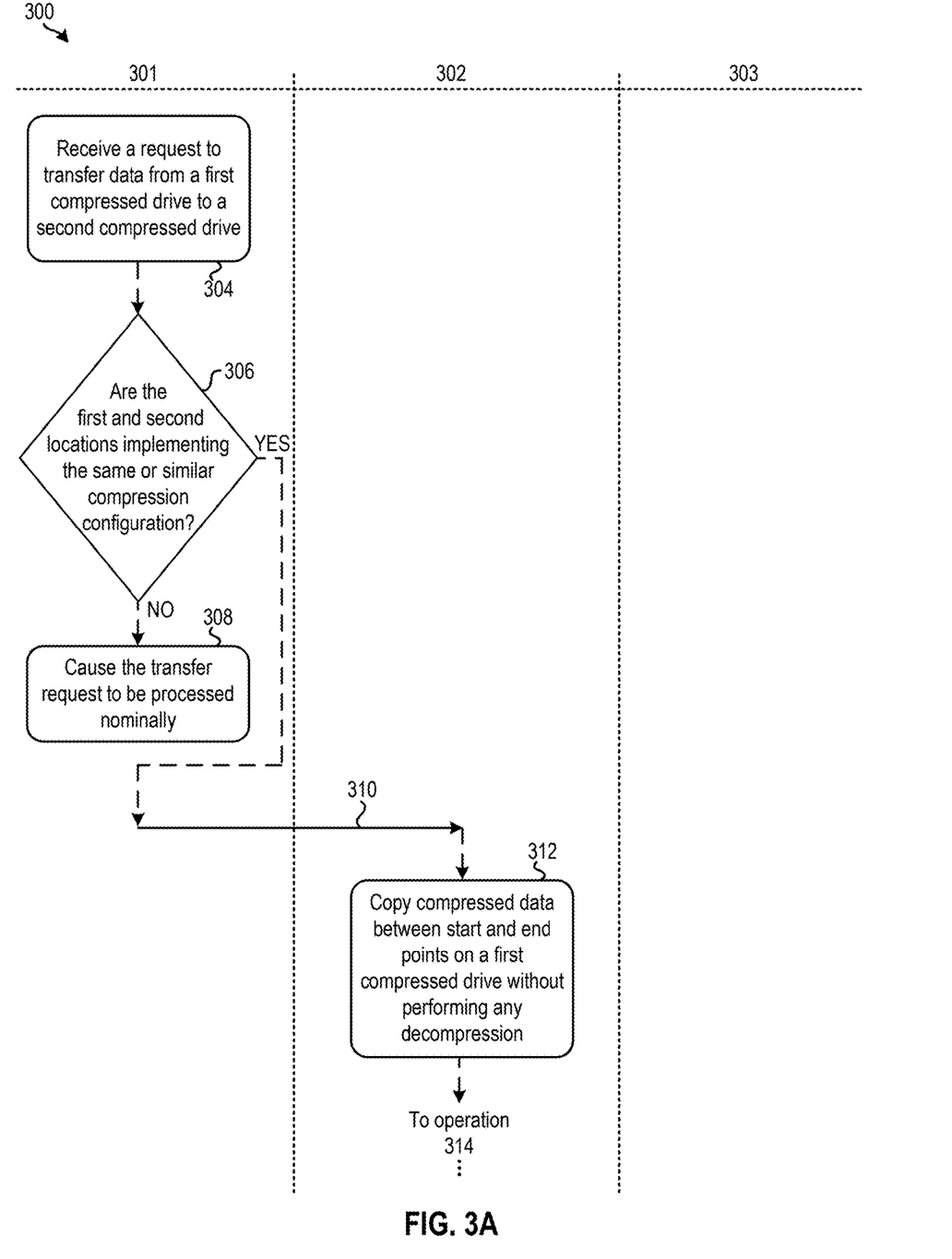
FIG. 3A is a flowchart of a method, in accordance with one approach.

Looking now to FIG. 3A, a flowchart of a computer-implemented-method 300 for improved processing of compressed data. The operations of method 300 may work in combination with an interface that allows for compressed data to be transferred between environments that implement the same or similar compression configurations, without decompressing and recompressing the data in order to do so.

The method 300 may be performed in accordance with the present invention in any of the environments depicted in FIGS. 1-2C, among others, in various approaches. Of course, more or less operations than those specifically described in FIG. 3A may be included in method 300, as would be understood by one of skill in the art upon reading the present descriptions. Each of the operations in method 300 may be performed by any suitable component of the operating environment. For example, the nodes 301, 302, 303 shown in the flowchart of method 300 may correspond to one or more processors positioned at a different location in a distributed system. Moreover, each of the one or more processors are preferably configured to communicate with each other.

In various approaches, the method 300 may be partially or entirely performed by a controller, a processor, etc., or some other device having one or more processors therein. The processor, e.g., processing circuit(s), chip(s), and/or module (s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

As mentioned above, FIG. 3A includes different nodes 301, 302, 303, each of which represent one or more processors, controllers, computer, etc., positioned at a different location in a distributed system. For example, in some approaches one or more of the operations in method 300 may involve one or more components in a system having compressed data in compressed drives, which may be connected to a central server as part of a larger distributed system. Accordingly, node 301 may include one or more processors which are located at a central server of a distributed system (e.g., see processor 230 of FIG. 2A). Moreover, node 302 may include one or more processors which are located at a first compressed environment (e.g., see edge node 204 of FIG. 2A). Furthermore, node 303 may include one or more processors which are located at a second compressed environment (e.g., see edge node 206 of FIG. 2A).

Accordingly, commands, code, data, metadata outlining code updates, etc., may be sent between the nodes 301, 302, 303 depending on the approach. It should also be noted that the various processes included in method 300 are in no way intended to be limiting, e.g., as would be appreciated by one skilled in the art after reading the present description. For instance, data sent from node 302 to node 301 may be prefaced by a request sent from node 301 to node 302 in some approaches.

Looking to FIG. 3A, operation 304 includes receiving a request to transfer data from a first compressed drive to a second compressed drive. In other words, operation 304 includes receiving a request to move data between two locations implementing data compression. Depending on the approach, the request may be received from a running application, a controller, in response to a predetermined condition being met, etc. For instance, the transfer request may be received in correlation with an initial copy of a system. According to a non-limiting example, background copy requests in Flash copy may be used to copy data from a source volume to a target volume. According to another non-limiting example, approaches implementing peer-to-peer remote copy may use initial copy to copy data from a source volume to a secondary volume.

In response to receiving the request, method 300 advances to operation 306. There, the request is evaluated, and a determination is made as to whether the request involves transferring data between locations that use the same or substantially similar compression configurations. In other words, operation 306 determines whether the source and target of a received transfer request implement the same or similar compression configurations. As noted above, the compression configuration of a given location may be determined by identifying the compression rate, compression pattern, formatting details, compressed data lookup scheme, etc. Thus, operation 306 may be determined in some approaches based at least in part on the number of compression configuration constraints matching between the source and target locations (e.g., data volumes). In other approaches, operation 306 may be performed by accessing one or more lookup tables, querying one or more locations, etc.

In response to determining that the source and target of a received transfer request do not implement the same or similar compression configurations, method 300 advances to operation 308. There, operation 308 includes causing the received transfer request to be processed nominally. In other words, operation 308 includes sending one or more instructions that ultimately cause: the compressed data at the source location to be decompressed, the decompressed data to be copied, the decompressed data to be transferred to the target location, the data to be recompressed, and the recompressed data to be written to the target location.

However, method 300 advances from operation 306 to operation 310 in response to determining that the source and target of the received transfer request do implement the same or similar compression configurations. There, operation 310 includes causing the compressed data identified in the request to be read from a source location without decompressing the compressed data. In other words, operation 310 includes sending one or more instructions to node 302. The instructions ultimately cause node 302 to copy compressed data between start and end points on a first compressed drive without performing any decompression. See operation 312.

Figure 3B:
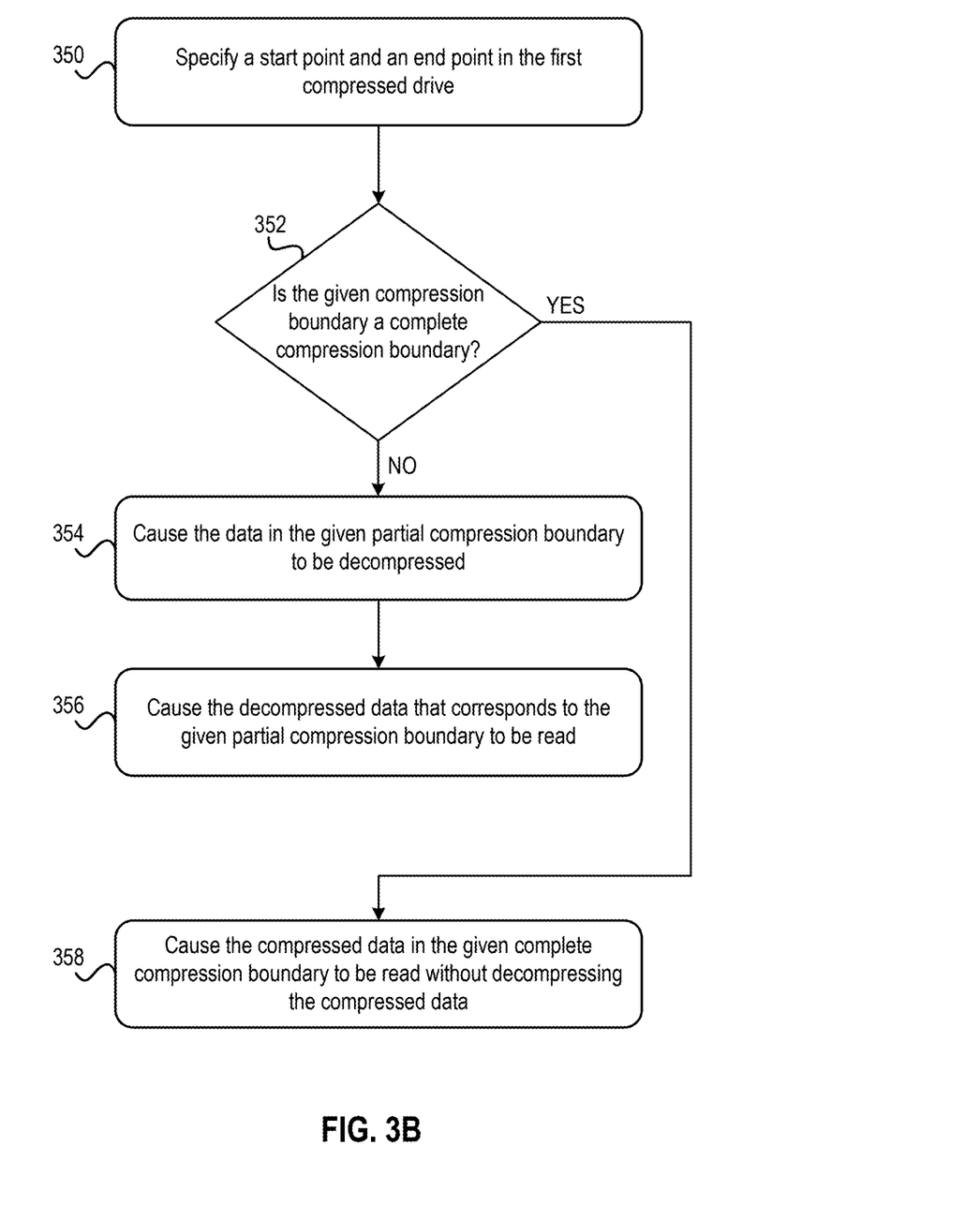
FIG. 3B is a flowchart of sub-operations for one or more of the operations in the method of FIG. 3A, in accordance with one approach.

As noted above, because the source and target locations for the data transfer have been determined as implementing the same or similar compression configuration, the compressed data may be transferred without decompressing it at all in transit. Referring now to FIG. 3B, exemplary sub-operations of reading compressed data between start and end points on a source compressed drive without performing any decompression are illustrated in accordance with one approach. It follows that one or more of these sub-operations may be performed in operation 312 at node 302 in response to the instructions that are sent in operation 310 of FIG. 3A. However, it should be noted that the sub-operations of FIG. 3B are illustrated in accordance with one approach which is in no way intended to be limiting.

As shown, sub-operation 350 includes specifying a start point and an end point in the first compressed drive that outline the compressed data being read as a result of the transfer request. As noted above, in some approaches the start and/or end points may be aligned with intersections between compression boundaries in the source drive. This allows for the data in complete compression boundaries to be extracted from the source drive without decompressing the data (e.g., see FIG. 2B). However, the start and/or end points may fall between the intersections of the compression boundaries in the source drive (e.g., see FIG. 2C).

Proceeding to sub-operation 352, each of the compression boundaries positioned between the start and end points are evaluated. Moreover, sub-operation 352 includes determining whether each compression boundary is a complete compression boundary. In other words, sub-operation 352 determines whether the data in each compression boundary being read can be extracted in compressed form. In some approaches, sub-operation 352 inspects the length of each compression boundary and compares it to a predetermined length of the complete boundaries.

In response to determining that a given compression boundary is not a complete compression boundary, the flowchart proceeds to sub-operation 354. In other words, the flowchart proceeds to sub-operation 354 in response to determining the given boundary is a partial compression boundary. There, sub-operation 354 includes causing the data in the compression boundary to be decompressed. Moreover, sub-operation 356 includes causing the decompressed data that corresponds to the given partial compression boundary to be read (e.g., extracted).

Alternatively, the flowchart proceeds to sub-operation 358 from sub-operation 352 in response to determining a given boundary is a complete (e.g., full) compression boundary. There, sub-operation 358 includes causing the compressed data in the given complete compression boundary to be read without decompressing the compressed data. In other words, sub-operation 358 includes causing the compressed data in each identified complete compression boundary to be read from a source volume in the first compressed drive without decompressing the compressed data.

Again, the sub-operations of FIG. 3B may be repeated for each compression boundary included between the start and end points identified in sub-operation 350. It follows that the data produced with each iteration of the sub-operations may be accumulated before being transferred to a target location, e.g., as will be described in further detail below.

Referring back to FIG. 3A, operation 314 includes receiving a copy of the requested compressed data from the source location (e.g., source volume) at node 302. In response to receiving the compressed data at node 301, optional operation 316 includes temporarily storing the compressed data in memory. In other words, optional operation 316 may include storing the compressed data in a buffer, write queue, cache, etc., that at least temporarily stores the compressed data. Furthermore, operation 318 includes transmitting the copy of the compressed data to a target location at node 303. In other words, operation 318 includes transmitting a copy of the compressed data to a second compressed drive.

From operation 318, method 300 advances to operation 320. There, operation 320 includes causing the compressed data to be written to the target location in a second location without compressing the compressed data. In other words, operation 320 includes causing the compressed data sent in operation 318 to be written to a target compression block of a volume in the second compressed drive without performing any data compression. It should be noted that while operations 318, 320 are shown as two different operations in FIG. 3A, this is in no way intended to be limiting. In other approaches, the one or more instructions sent here in operation 320 may be combined with the compressed data sent in operation 318. In other words, operations 318 and 320 may be combined in some approaches.

In response to receiving the compressed data and instructions at node 303, method 300 advances to operation 322. There, the instructions ultimately cause node 303 to write the compressed data between start and end points on a target compressed drive without performing any compression. As noted above, because the source and target locations for the data transfer have been determined as implementing the same or similar compression configuration, the compressed data may be transferred without decompressing it at all in transit.

Figure 3C:
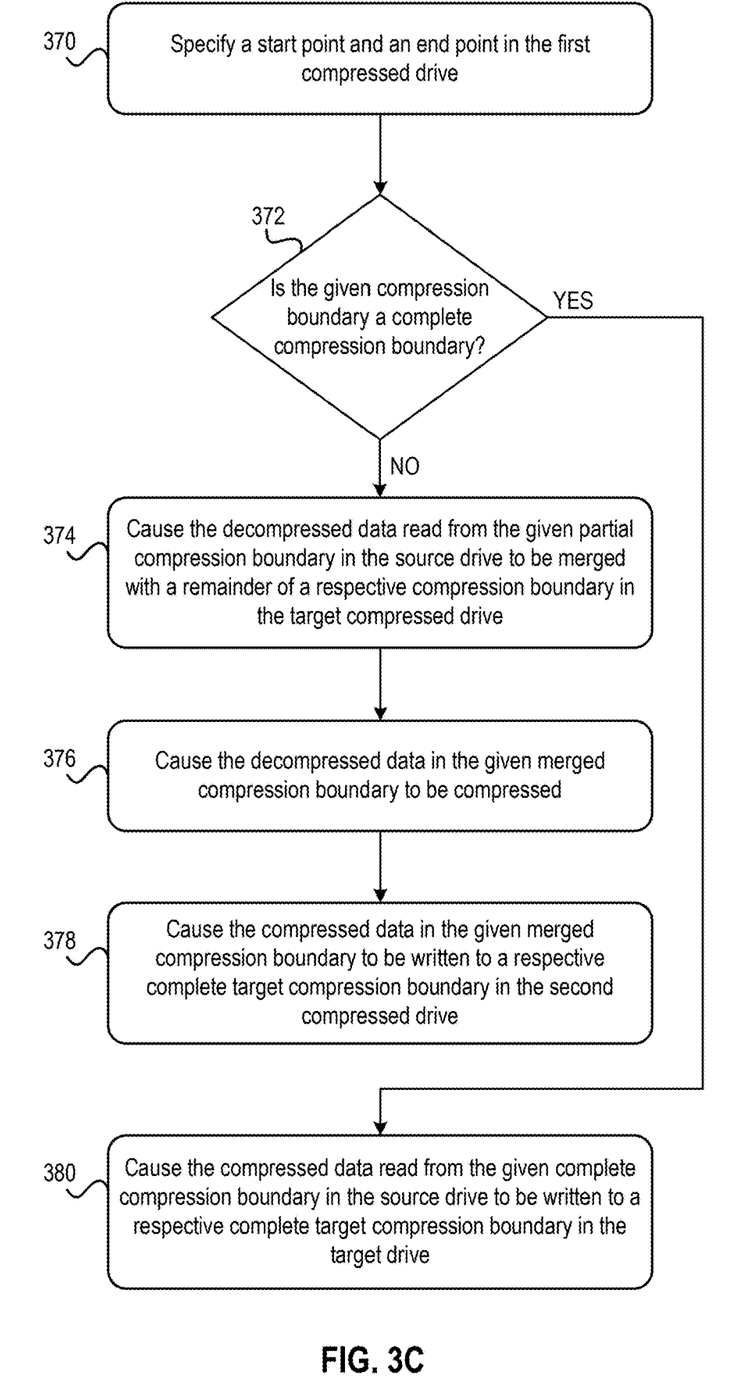
FIG. 3C is a flowchart of sub-operations for one or more of the operations in the method of FIG. 3A, in accordance with one approach.

Referring now to FIG. 3C, exemplary sub-operations of writing compressed data between start and end points on a target compressed drive without performing any compression are illustrated in accordance with one approach. It follows that one or more of these sub-operations may be performed in operation 322 at node 303 in response to the instructions that are sent in operation 320 of FIG. 3A. However, it should be noted that the sub-operations of FIG. 3C are illustrated in accordance with one approach which is in no way intended to be limiting.

As shown, sub-operation 370 includes specifying a start point and an end point in the second compressed drive that outline the compressed data being written as a result of the transfer request. As noted above, in some approaches the start and/or end points may be aligned with intersections between compression boundaries in the target drive. This allows for the data to be written to complete compression boundaries in the target drive without compressing the data (e.g., see FIG. 2B). However, the start and/or end points may fall between the intersections of the compression boundaries in the source drive (e.g., see FIG. 2C).

Proceeding to sub-operation 372, each of the compression boundaries positioned between the start and end points are evaluated. Moreover, sub-operation 372 includes determining whether each compression boundary is a complete compression boundary. In other words, sub-operation 372 determines whether the data being written to each compression boundary can be written in compressed form. In some approaches, sub-operation 372 inspects the length of each compression boundary and compares it to a predetermined length of the complete boundaries. In other approaches, sub-operation 372 inspects one or more lookup tables, flags, predefined memory locations, etc., to determine whether each grouping of data is being written to a complete compression boundary.

In response to identifying a partial compression boundary write, and identifying the data cannot be written in compressed form, the flowchart proceeds to sub-operation 374. In other words, the flowchart proceeds to sub-operation 374 in response to determining data is only being written to a portion of a given compression boundary. There, sub-operation 374 includes causing the decompressed data read from a corresponding partial compression boundary in the source drive to be merged with a remainder of a respective compression boundary in the target compressed drive. In other words, sub-operation 374 includes sending one or more instructions that result in the decompressed data extracted from a partial compression boundary read in the source drive, to be combined with a remainder of the data in a target compression boundary.

According to an example which is in no way intended to be limiting, the last 0.25 Megabytes (MB) of a full 1 MB compression boundary may be copied from a source volume after being decompressed. This 0.25 MB of decompressed data may thereby be combined with the first 0.75 MB of data decompressed from a corresponding full 1 MB compression boundary in the target volume.

Proceeding to sub-operation 376, the decompressed data in each of the merged compression boundaries is compressed. Furthermore, sub-operation 378 includes causing the compressed data in each of the merged compression boundaries to be written to a respective complete target compression boundary in the second compressed drive. However, it should be noted that in some approaches, the data corresponding to a partial compression boundary write may simply be ignored. For instance, the amount of data being written in a partial compression boundary write may be compared to a predetermined range. Thus, in response to determining the amount of new data being written is inside the predetermined range (e.g., sufficiently high), sub-operations 374, 376, 378 may be performed. However, in response to determining the amount of new data being written is outside the predetermined range (e.g., insufficiently high), sub-operations 374, 376, 378 may simply be skipped.

Returning to sub-operation 372, the flowchart alternatively proceeds from sub-operation 372 to sub-operation 380 in response to determining that a given boundary is a complete (e.g., full) compression boundary. There, sub-operation 380 includes causing the compressed data read from a corresponding complete compression boundary in the source drive to be written to a respective complete target compression boundary in the target drive. Moreover, this writing of the compressed data to complete compression boundaries does not involve performing any data compression (or decompression). In other words, the compressed data is not decompressed between: being read from the first (e.g., source) compressed drive, and being written to a location in the second (e.g., target) compressed drive. Furthermore, the sub-operations of FIG. 3C may be repeated for each compression boundary included between the start and end points identified in sub-operation 370.

It will be clear that the various features of the foregoing systems and/or methodologies may be combined in any way, creating a plurality of combinations from the descriptions presented above.

It will be further appreciated that implementations of the present invention may be provided in the form of a service deployed on behalf of a customer to offer service on demand.

The descriptions of the various implementations of the present invention have been presented for purposes of illustration, but are not intended to be exhaustive or limited to the implementations disclosed. Many modifications and variations will be apparent to those of ordinary skill in the art without departing from the scope and spirit of the described implementations. The terminology used herein was chosen to best explain the principles of the implementations, the practical application or technical improvement over technologies found in the marketplace, or to enable others of ordinary skill in the art to understand the implementations disclosed herein.

What is claimed is:

1. A computer-implemented method (CIM), comprising:
    causing compressed data to be read from a first compressed drive without decompressing the compressed data by:
        for respective partial compression boundaries between a start point and an end point in the first compressed drive that outline the compressed data to be read, causing:
            the compressed data therein to be decompressed, and
            the decompressed data corresponding to the respective partial compression boundary to be read;
    receiving a copy of the compressed data from the first compressed drive;
    in response to determining a target location for the copy of the compressed data is a second compressed drive having a same configuration as the first compressed drive, transmitting the copy of the compressed data to the second compressed drive; and
    causing the compressed data to be written to the target location in the second compressed drive without compressing the compressed data.

2. The CIM of claim 1, wherein the causing of the compressed data to be read from the first compressed drive without decompressing the compressed data includes:
    specifying the start point and the end point in the first compressed drive that outline the compressed data to be read; and
    for each complete compression boundary positioned between the start point and the end point, causing the compressed data therein to be read from the first compressed drive without decompressing the compressed data.

3. The CIM of claim 1, further comprising:
    writing first data to a first of the partial compression boundaries by:
        causing a remainder of a first compression boundary that includes the first partial compression boundary to be decompressed,
        causing the decompressed data from the remainder of the first compression boundary and the first data to be combined,
        causing the combined data to be compressed, and
        causing the compressed data to be written to the first compression boundary.

4. The CIM of claim 2, wherein the start and end points are aligned with intersections between the compression boundaries.

5. The CIM of claim 2, wherein the causing of the compressed data to be written to the target location in the second compressed drive without compressing the compressed data includes:
   causing the compressed data read from the complete compression boundaries in the first compressed drive to be written to respective complete target compression boundaries in the second compressed drive;
   causing the decompressed data read from each partial compression boundary in the first compressed drive to be merged with a remainder of a respective compression boundary in the second compressed drive;
   causing the decompressed data in each of the merged compression boundaries to be compressed; and
   causing the compressed data in each of the merged compression boundaries to be written to a respective complete target compression boundary in the second compressed drive.

6. The CIM of claim 5, further comprising:
   specifying a start point and an end point in the second compressed drive that outline where the compressed data is to be written,
   wherein each target compression boundary in the second compressed drive that corresponds to the merged compression boundaries is not completely positioned between the start and end points in the second compressed drive.

7. The CIM of claim 1, wherein the compressed data is received at a central server, wherein the compressed data is not decompressed between: being read from the first compressed drive, and being written to the target location in the second compressed drive.

8. The CIM of claim 7, wherein the first and second compressed drives include solid state drives (SSDs).

9. The CIM of claim 8, wherein the central server and the solid state drives are configured to form a data storage system.

10. A computer program product (CPP), comprising:
    a set of one or more computer-readable storage media; and
    program instructions, collectively stored in the set of one or more storage media, for causing a processor set to perform the following computer operations:
       cause compressed data to be read from a first compressed drive without decompressing the compressed data by:
          for respective partial compression boundaries between a start point and an end point in the first compressed drive that outline the compressed data to be read, causing:
             the compressed data therein to be decompressed, and
             the decompressed data corresponding to the respective partial compression boundary to be read;
       receive a copy of the compressed data from the first compressed drive;
       in response to determining a target location for the copy of the compressed data is a second compressed drive having a same configuration as the first compressed drive, transmit the copy of the compressed data to the second compressed drive; and
       cause the compressed data to be written to the target location in the second compressed drive without compressing the compressed data.

11. The CPP of claim 10, wherein the causing of the compressed data to be read from the first compressed drive without decompressing the compressed data includes:
    specifying the start point and the end point in the first compressed drive that outline the compressed data to be read; and
    for each complete compression boundary positioned between the start point and the end point, causing the compressed data therein to be read from the first compressed drive without decompressing the compressed data.

12. The CPP of claim 10, wherein the program instructions are for causing the processor set to further perform the following computer operations:
    write first data to a first of the partial compression boundaries by:
       causing a remainder of a first compression boundary that includes the first partial compression boundary to be decompressed,
       causing the decompressed data from the remainder of the first compression boundary and the first data to be combined,
       causing the combined data to be compressed, and
       causing the compressed data to be written to the first compression boundary.

13. The CPP of claim 11, wherein the start and end points are aligned with intersections between the compression boundaries.

14. The CPP of claim 11, wherein the causing of the compressed data to be written to the target location in the second compressed drive without compressing the compressed data includes:
    causing the compressed data read from the complete compression boundaries in the first compressed drive to be written to respective complete target compression boundaries in the second compressed drive;
    causing the decompressed data read from each partial compression boundary in the first compressed drive to be merged with a remainder of a respective compression boundary in the second compressed drive;
    causing the decompressed data in each of the merged compression boundaries to be compressed; and
    causing the compressed data in each of the merged compression boundaries to be written to a respective complete target compression boundary in the second compressed drive.

15. The CPP of claim 14, wherein the program instructions are for causing the processor set to further perform the following computer operations:
    specify a start point and an end point in the second compressed drive that outline where the compressed data is to be written,
    wherein each target compression boundary in the second compressed drive that corresponds to the merged compression boundaries is not completely positioned between the start and end points in the second compressed drive.

16. The CPP of claim 10, wherein the compressed data is received at a central server, wherein the compressed data is not decompressed between: being read from the first compressed drive, and being written to the target location in the second compressed drive.

17. The CPP of claim 16, wherein the first and second compressed drives include solid state drives (SSDs).

18. The CPP of claim 17, wherein the central server and the solid state drives are configured to form a data storage system.

19. A computer system (CS), comprising:
    a processor set;
    a set of one or more computer-readable storage media;

program instructions, collectively stored in the set of one or more storage media, for causing the processor set to perform the following computer operations:
cause compressed data to be read from a first compressed drive without decompressing the compressed data by:
for respective partial compression boundaries between a start point and an end point in the first compressed drive that outline the compressed data to be read, causing:
the compressed data therein to be decompressed, and
the decompressed data corresponding to the respective partial compression boundary to be read;
receive a copy of the compressed data from the first compressed drive;
in response to determining a target location for the copy of the compressed data is a second compressed drive having a same configuration as the first compressed drive, transmit the copy of the compressed data to the second compressed drive; and
cause the compressed data to be written to the target location in the second compressed drive without compressing the compressed data.

20. The CS of claim 19, wherein the causing of the compressed data to be read from the first compressed drive without decompressing the compressed data includes:
specifying the start point and the end point in the first compressed drive that outline the compressed data to be read; and
for each complete compression boundary positioned between the start point and the end point, causing the compressed data therein to be read from the first compressed drive without decompressing the compressed data.

* * * * *